(12) United States Patent
Yokoyama et al.

(10) Patent No.: US 11,629,099 B2
(45) Date of Patent: *Apr. 18, 2023

(54) SOLID COMPOSITION AND PRODUCTION METHOD FOR FUNCTIONAL CERAMIC

(71) Applicant: Seiko Epson Corporation, Tokyo (JP)

(72) Inventors: Tomofumi Yokoyama, Matsumoto (JP); Naoyuki Toyoda, Suwa (JP); Hitoshi Yamamoto, Chino (JP)

(73) Assignee: SEIKO EPSON CORPORATION

( * ) Notice: Subject to any disclaimer, the term of this patent is extended or adjusted under 35 U.S.C. 154(b) by 79 days.

This patent is subject to a terminal disclaimer.

(21) Appl. No.: 17/088,722

(22) Filed: Nov. 4, 2020

(65) Prior Publication Data

US 2021/0130240 A1   May 6, 2021

(30) Foreign Application Priority Data

Nov. 5, 2019  (JP) .............................. JP2019-201087

(51) Int. Cl.
   *C04B 35/505*  (2006.01)
(52) U.S. Cl.
   CPC .... *C04B 35/505* (2013.01); *C04B 2235/3217* (2013.01); *C04B 2235/3225* (2013.01); *C04B 2235/3229* (2013.01); *C04B 2235/764* (2013.01); *C04B 2235/768* (2013.01); *C04B 2235/79* (2013.01)
(58) Field of Classification Search
   CPC ........................... C04B 35/4682; C04B 35/505
   See application file for complete search history.

(56) References Cited

U.S. PATENT DOCUMENTS

| | | |
|---|---|---|
| 2011/0210658 A1 | 9/2011 | Pan et al. |
| 2017/0022112 A1 | 1/2017 | Karpenko et al. |
| 2017/0047589 A1 | 2/2017 | Noi et al. |
| 2018/0254477 A1 | 9/2018 | Horikawa et al. |

(Continued)

FOREIGN PATENT DOCUMENTS

| | | |
|---|---|---|
| CN | 102617140 A | 8/2012 |
| CN | 106232526 A | 12/2016 |

(Continued)

OTHER PUBLICATIONS

Wang Jianwu et al., "Preparation of SiC—Y3Al5O12 Composite Ceramics by Introducing Sintering Aids via Sol-Gel Method", Nano Science and Technology Center and Zhejiang Dongxin Sealing Materials Co., Ltd., Development & Application, Nai Huo Cai Liao/Refractories, 2005, pp. 192-195, with English translation.

(Continued)

*Primary Examiner* — Karl E Group
(74) *Attorney, Agent, or Firm* — Harness, Dickey & Pierce, P.L.C.

(57) ABSTRACT

A solid composition according to the present disclosure is a solid composition to be used for forming a functional ceramic having a crystal phase, and contains an oxide constituted by a crystal phase different from the crystal phase of the functional ceramic at normal temperature and normal pressure, and an oxoacid compound. The oxoacid compound preferably contains at least one of a nitrate ion and a sulfate ion as an oxoanion. Further, the oxide preferably has a crystal grain size of 10 nm or more and 200 nm or less.

5 Claims, 1 Drawing Sheet

(56) References Cited

U.S. PATENT DOCUMENTS

2018/0342764 A1    11/2018  Holme et al.
2021/0280900 A1*    9/2021  Yokoyama .......... H01M 10/0562
2021/0313619 A1*   10/2021  Holme ................. C01G 25/006
2021/0320325 A1*   10/2021  Furusawa .......... H01M 10/0562

FOREIGN PATENT DOCUMENTS

| JP | 2010-045019 A | 2/2010 |
| JP | 2011-073937 A | 4/2011 |
| JP | 5763683 B2 | 8/2015 |
| JP | 2017-094442 A | 6/2017 |
| JP | 2018-147726 A | 9/2018 |
| JP | 2019-003786 A | 1/2019 |
| WO | 2015-163152 A1 | 10/2015 |

OTHER PUBLICATIONS

Zhao Wenqing et al., "Preparation of YAG Phosphor by Sol-Gel Method and Study on Its Properties", Institute of Materials Science and Engineering, Henan Polytechnic University, New Chemical Materials, vol. 37, No. 12, Dec. 2009, pp. 98-100, with English translation.

Jia Guangyao et al., "Effect of Nitrate Salts as Sintering Additives to the Mechanical Properties of Silicon Nitride Material", Shandong R&D Institute of Industrial Ceramics, Research & Application, Ceramic Engineering, Dec. 2001, pp. 3, 4, and 12, with English translation.

\* cited by examiner

SOLID COMPOSITION AND PRODUCTION METHOD FOR FUNCTIONAL CERAMIC

The present application is based on, and claims priority from JP Application Serial Number 2019-201087, filed on Nov. 5, 2019, the disclosure of which is hereby incorporated by reference herein in its entirety.

BACKGROUND

1. Technical Field

The present disclosure relates to a solid composition and a production method for a functional ceramic.

2. Related Art

Various types of functional ceramics constituted by a multiple oxide, specifically, for example, functional ceramics such as phosphor ceramics, wavelength conversion ceramics, magnetic ceramics, and superconductor ceramics are known.

Heretofore, a multiple oxide ceramic has been obtained by mixing a plurality of oxide particles or compounds composed of each of the constituent elements thereof and performing a synthetic reaction in an oxidizing atmosphere, followed by pulverization and molding, and thereafter, performing high temperature firing again.

For example, Japanese Patent No. 5763683 (Patent Document 1) discloses a method in which when a composite body containing yttrium aluminum garnet that is a phosphor ceramic and a wavelength conversion ceramic in a stacked manner is produced, a mixture of an oxide powder to serve as a raw material of each of the phosphor ceramic and the wavelength conversion ceramic is subjected to tape molding, the molded materials are stacked, and the stacked material is fired at a high temperature.

Further, JP-A-2011-73937 (Patent Document 2) describes a method for forming a magnetic ceramic for a nonreciprocal circuit element by integrally firing an yttrium iron garnet ceramic to be used as a ferrite core with an electric conductor composed of a noble metal.

Further, JP-A-2017-94442 (Patent Document 3) discloses that in order to form a YBCO element to be used as a superconductor, YBCO synthesized by high temperature firing is pulverized to obtain a pulverized material, and thereafter the pulverized material is hardened by firing again, whereby a bulky element is obtained.

In the case of the Patent Document 1, by performing a heat treatment, that is, firing again after pulverizing a product obtained by a heat treatment, that is, annealing, yttrium ions are volatilized in the firing gas, and therefore, there was a problem that the composition of a ceramic to be finally obtained deviates from the desired composition, and a desired property cannot be obtained.

Further, in the Patent Document 2, by simultaneously firing different oxides at a high temperature, unnecessary element diffusion is likely to occur at a heterogeneous interface, and a defect such as an oxygen vacancy is generated inside, and therefore, there was a problem that the properties as the phosphor are deteriorated.

Further, in the Patent Document 3, an impurity crystal involved in the phase transition of a crystal or the generation of an oxygen defect is likely to be formed during refiring at a high temperature, and there was a problem that a critical current density in a magnetic field that is a main property as a superconductor is decreased.

In order to avoid a problem as described above, a firing aid is sometimes added, however, in that case, this is sometimes accompanied by reaction firing, and a byproduct such as water or an acid is generated when releasing heat accompanying thermal decomposition of a flux or phase transformation, and therefore, there was a problem that an interface between heterogeneous materials is etched.

SUMMARY

The present disclosure has been made for solving the above problems and can be realized as the following application examples.

A solid composition according to an application example of the present disclosure is a solid composition to be used for forming a functional ceramic having a crystal phase, and contains an oxide constituted by a crystal phase different from the crystal phase of the functional ceramic at normal temperature and normal pressure, and an oxoacid compound.

In the solid composition according to another application example of the present disclosure, the oxoacid compound may contain at least one of a nitrate ion and a sulfate ion as an oxoanion.

In the solid composition according to another application example of the present disclosure, the crystal phase of the oxide may be a perovskite-type crystal, and the crystal phase of the functional ceramic may be a cubic garnet-type crystal.

In the solid composition according to another application example of the present disclosure, the crystal phase of the oxide may be a cubic crystal, and the crystal phase of the functional ceramic may be a perovskite-type crystal.

In the solid composition according to another application example of the present disclosure, the crystal phase of the oxide may be a $YFeO_3$-type crystal, and the crystal phase of the functional ceramic may be a garnet-type crystal.

In the solid composition according to another application example of the present disclosure, the oxide may have a crystal grain size of 10 nm or more and 200 nm or less.

A production method for a functional ceramic according to an application example of the present disclosure includes heating the solid composition according to the present disclosure to a temperature of 700° C. or higher and 1000° C. or lower.

DESCRIPTION OF EXEMPLARY EMBODIMENTS

Figure 1:
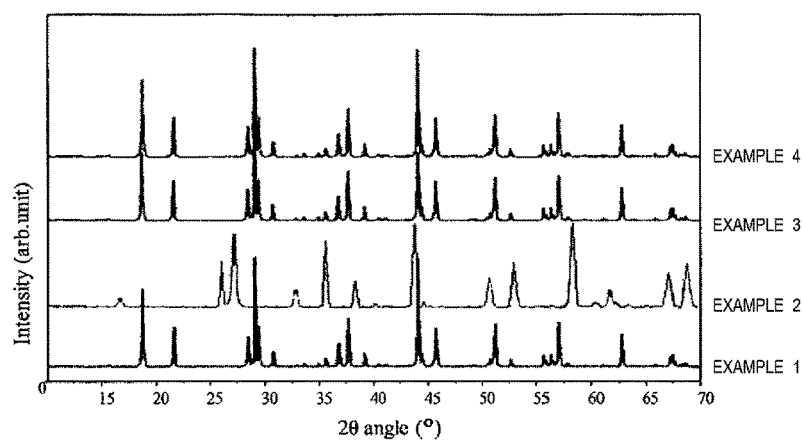
FIG. 1 is a graph showing X-ray diffraction patterns for solid compositions of Examples 1 to 4.

Hereinafter, preferred embodiments of the present disclosure will be described in detail.

[1] Solid Composition

First, a solid composition according to the present disclosure will be described.

The solid composition according to the present disclosure is to be used for forming a functional ceramic having a crystal phase. The solid composition is configured to contain an oxide constituted by a crystal phase different from the crystal phase of the functional ceramic at normal temperature and normal pressure, and an oxoacid compound.

According to this, a solid composition capable of stably forming a functional ceramic having a desired property by a heat treatment at a relatively low temperature and for a relatively short time can be provided. More specifically, by incorporating an oxoacid compound in the solid composition, the melting point of the oxide is lowered, and growth of a high-temperature phase crystal can be promoted by a firing treatment that is a heat treatment at a relatively low temperature for a relatively short time. Further, while suppressing etching at an interface or generation of a byproduct, the melting point of the oxide is lowered, and the firing temperature or the joining temperature to a heterogeneous material can be lowered, and for example, the adhesion to an adherend can be made excellent even by a heat treatment at a relatively low temperature.

On the other hand, when the conditions as described above are not satisfied, satisfactory results are not obtained.

For example, when the solid composition does not contain an oxoacid compound, the effect of lowering the melting point of the oxide is not obtained, and in a heat treatment at a relatively low temperature for a relatively short time, firing does not sufficiently proceed, and it becomes difficult to obtain a functional ceramic having a desired crystal phase.

Further, when the solid composition does not contain the above-mentioned oxide, a functional ceramic, particularly a functional ceramic constituted by a multiple oxide cannot be formed.

Note that in the present disclosure, the normal temperature and normal pressure refers to 25° C. and 1 atm.

[1-1] Oxide

The solid composition according to the present disclosure contains an oxide having a crystal phase different from that of the functional ceramic to be formed using the solid composition. Hereinafter, the oxide is also referred to as "precursor oxide". Further, in the present disclosure, the "different" in terms of crystal phase is a broad concept not only including that the type of crystal phase is not the same, but also including that even if the type is the same, at least one lattice constant is different, or the like. Further, the functional ceramic will be described in detail later.

The precursor oxide need only have a crystal phase different from the crystal phase of the functional ceramic to be formed using the solid composition according to the present disclosure. There are various combinations of the form of the crystal phase of the functional ceramic with the form of the crystal phase of the precursor oxide, however, for example, when the crystal phase of the functional ceramic to be formed using the solid composition according to the present disclosure is a cubic garnet-type crystal, the crystal phase of the precursor oxide is a perovskite-type crystal.

The garnet-type crystal had a problem that the composition is likely to deviate due to volatilization of the A-site ion during high temperature firing, and elemental segregation occurs at a grain boundary triple junction or the like, and therefore, the properties of a ceramic are likely to deteriorate. On the other hand, according to the present disclosure, due to the lowering of the temperature at which crystal phase transformation occurs or the lowering of the melting point by the oxoacid, the uniformity of the composition and the crystalline property are improved, and therefore, a process of performing formation and firing of a crystal at a low temperature can be applied, and in particular, when the crystal phase of the precursor oxide is a perovskite-type crystal, the functional ceramic constituted by a cubic garnet-type crystal can be more stably formed with a desired composition. Accordingly, when the crystal phase of the functional ceramic to be formed using the solid composition according to the present disclosure is a cubic garnet-type crystal and the crystal phase of the precursor oxide is a perovskite-type crystal, the effect of the present disclosure is more remarkably exhibited.

By heating the solid composition containing the precursor oxide having a perovskite-type crystal at a relatively low temperature, for example, in a temperature range of 700° C. or higher and 1000° C. or lower, particularly in a temperature range of 800° C. or higher and 950° C. or lower, a high quality functional ceramic constituted by a cubic garnet-type crystal can be obtained.

Further, for example, when the crystal phase of the functional ceramic to be formed using the solid composition according to the present disclosure is a perovskite-type crystal, the crystal phase of the precursor oxide is a cubic crystal.

According to this, even if the firing is performed at a lower temperature, a fired body having a high crystalline property can be favorably obtained.

By heating the solid composition containing the precursor oxide having a cubic crystal at a relatively low temperature, for example, in a temperature range of 700° C. or higher and 1000° C. or lower, particularly in a temperature range of 800° C. or higher and 950° C. or lower, a high quality functional ceramic constituted by a perovskite-type crystal can be obtained.

Further, for example, when the crystal phase of the functional ceramic to be formed using the solid composition according to the present disclosure is a garnet-type crystal, the crystal phase of the precursor oxide is a $YFeO_3$-type crystal.

According to this, even if the firing is performed at a lower temperature, it is easy to favorably obtain a fired body having a high crystalline property, and for example, a thin film having a high magneto-optical property is easily obtained.

By heating the solid composition containing the precursor oxide having a $YFeO_3$-type crystal at a relatively low temperature, for example, in a temperature range of 700° C. or higher and 1000° C. or lower, particularly in a temperature range of 720° C. or higher and 800° C. or lower, a high quality functional ceramic constituted by a garnet-type crystal can be obtained.

The crystal phase of the precursor oxide is not limited to those described above as long as it is different from the crystal phase of the functional ceramic, and may be, for example, an orthorhombic crystal, a hexagonal crystal, or the like.

Further, the crystal phase of the functional ceramic is not limited to those described above as long as it is different from the crystal phase of the precursor oxide, and may be, for example, an orthorhombic crystal, a hexagonal crystal, a monoclinic crystal, or the like.

The composition of the precursor oxide is not particularly limited, and is generally determined according to the composition of the functional ceramic to be produced using the solid composition according to the present disclosure.

For example, when the functional ceramic to be produced using the solid composition according to the present disclosure is $YAG:Ce^{3+}$ to be used as a phosphor ceramic or the like, that is, cerium-doped yttrium aluminum garnet, the precursor oxide is preferably a multiple oxide containing yttrium, aluminum, and cerium.

Further, when the functional ceramic to be produced using the solid composition according to the present disclosure is YBCO to be used as a superconductor ceramic or the like, that is, yttrium barium copper perovskite, the precursor oxide is preferably a multiple oxide containing yttrium, barium, and copper.

The crystal grain size of the precursor oxide is not particularly limited, but is preferably 10 nm or more and 200 nm or less, more preferably 15 nm or more and 180 nm or less, further more preferably 20 nm or more and 160 nm or less.

According to this, due to a so-called Gibbs-Thomson effect that is a phenomenon of lowering the melting point with an increase in surface energy, the melting temperature of the precursor oxide or the firing temperature of the solid composition can be further lowered. Further, this is also advantageous to the improvement of joining of the functional ceramic to be formed using the solid composition according to the present disclosure to a heterogeneous material or the reduction of the defect density.

The precursor oxide is preferably constituted by a substantially single crystal phase.

According to this, the precursor oxide undergoes crystal phase transition substantially once when producing the functional ceramic, that is, when generating a high-temperature crystal phase using the solid composition according to the present disclosure, and therefore, segregation of elements accompanying the crystal phase transition or generation of a contaminant crystal by thermal decomposition is suppressed, so that various properties of the functional ceramic to be produced, for example, optical, electrical, and mechanical properties are further improved.

In a case where only one exothermic peak is observed within a range of 300° C. or higher and 1,000° C. or lower when measurement is performed by TG-DTA at a temperature raising rate of 10° C./min for the solid composition according to the present disclosure, it can be determined that "it is constituted by a substantially single crystal phase".

The content ratio of the precursor oxide in the solid composition according to the present disclosure is not particularly limited, but is preferably 20 mass % or more and 95 mass % or less, more preferably 35 mass % or more and 85 mass % or less, further more preferably 50 mass % or more and 80 mass % or less.

According to this, even if the heat treatment for the solid composition is performed at a lower temperature for a shorter time, the functional ceramic having an excellent desired property can be more stably produced.

The solid composition according to the present disclosure may contain multiple types of precursor oxides. When the solid composition according to the present disclosure contains multiple types of precursor oxides, as the value of the content ratio of the precursor oxide in the solid composition according to the present disclosure, the sum of the content ratios of the precursor oxides shall be adopted.

[1-2] Oxoacid Compound

The solid composition according to the present disclosure contains an oxoacid compound containing no metal elements.

By incorporating the oxoacid compound in this manner, the melting point of the precursor oxide is favorably lowered, and the crystal growth of the multiple oxide as the functional ceramic can be promoted, and by the heat treatment at a relatively low temperature for a relatively short time, the functional ceramic having a desired property can be stably formed. Further, the adhesion between the functional ceramic to be formed and an adherend can be made favorable.

The oxoacid compound is a compound containing an oxoanion.

Examples of the oxoanion constituting the oxoacid compound include a halogen oxoacid, a borate ion, a carbonate ion, an orthocarbonate ion, a carboxylate ion, a silicate ion, a nitrite ion, a nitrate ion, a phosphorous ion, a phosphate ion, an arsenate ion, a sulfite ion, a sulfate ion, a sulfonate ion, and a sulfinate ion. Examples of the halogen oxoacid include a hypochlorous ion, a chlorite ion, a chlorate ion, a perchlorate ion, a hypobromite ion, a bromite ion, a bromate ion, a perbromate ion, a hypoiodite ion, an iodite ion, an iodate ion, and a periodate ion.

In particular, the oxoacid compound preferably contains, as the oxoanion, at least one of a nitrate ion and a sulfate ion, and more preferably contains a nitrate ion.

According to this, the melting point of the precursor oxide is more favorably lowered, and the crystal growth of the multiple oxide as the functional ceramic can be more effectively promoted. As a result, even if the heat treatment for the solid composition is performed at a lower temperature for a shorter time, the functional ceramic having an excellent desired property can be more favorably obtained.

A cation constituting the oxoacid compound is not particularly limited, and examples thereof include a hydrogen ion, an ammonium ion, an yttrium ion, an aluminum ion, a cerium ion, a barium ion, and a copper ion, and one type or a combination of two or more types selected from these can be used, however, it is preferably an ion of a constituent metal element of the functional ceramic to be formed using the solid composition according to the present disclosure.

According to this, an undesirable impurity can be more effectively prevented from remaining in the functional ceramic to be formed.

When the oxoacid compound is a compound containing a lithium ion together with an oxoanion, it can be said that the compound is an oxoacid compound and also is a lithium compound.

The content ratio of the oxoacid compound in the solid composition according to the present disclosure is not particularly limited, but is preferably 0.1 mass % or more and 80 mass % or less, more preferably 1 mass % or more and 50 mass % or less, further more preferably 5 mass % or more and 20 mass % or less.

According to this, the functional ceramic can be favorably obtained from the solid composition by the heat treatment at a lower temperature for a shorter time while more reliably preventing the oxoacid compound from undesirably remaining in the functional ceramic to be formed using the solid composition according to the present disclosure, and the desired property of the functional ceramic to be obtained can be made particularly excellent.

When the content ratio of the precursor oxide in the solid composition according to the present disclosure is represented by XP [mass %] and the content ratio of the oxoacid compound in the solid composition according to the present disclosure is represented by XO [mass %], it is preferred to satisfy a relationship: $0.001 \leq XO/XP \leq 4$, it is more preferred to satisfy a relationship: $0.01 \leq XO/XP \leq 2$, and it is further more preferred to satisfy a relationship: $0.05 \leq XO/XP \leq 0.25$.

According to this, the functional ceramic can be favorably obtained from the solid composition by the heat treatment at a lower temperature for a shorter time while more reliably preventing the oxoacid compound from undesirably remaining in the functional ceramic to be formed using the solid composition according to the present disclosure, and the desired property of the functional ceramic to be obtained can be made particularly excellent.

The solid composition according to the present disclosure may contain multiple types of oxoacid compounds. When the solid composition according to the present disclosure contains multiple types of oxoacid compounds, as the value of the content ratio of the oxoacid compound in the solid composition according to the present disclosure, the sum of the content ratios of the oxoacid compounds shall be adopted.

[1-3] Another Component

The solid composition according to the present disclosure contains the precursor oxide and the oxoacid compound as described above, but may further contain a component other than these. Hereinafter, among the components constituting the solid composition according to the present disclosure, a component other than the precursor oxide and the oxoacid compound is referred to as "another component".

As such another component contained in the solid composition according to the present disclosure, for example, an oxide having the same crystal phase as that of the functional ceramic to be formed using the solid composition according to the present disclosure, a solvent component used in a production process for the solid composition according to the present disclosure, or the like is exemplified.

The content ratio of such another component in the solid composition according to the present disclosure is not particularly limited, but is preferably 10 mass % or less, more preferably 5.0 mass % or less, further more preferably 0.5 mass % or less.

The solid composition according to the present disclosure may contain multiple types of components as such another component. In that case, as the value of the content ratio of another component in the solid composition according to the present disclosure, the sum of the content ratios of the components shall be adopted.

[2] Production Method for Solid Composition

Next, a production method for the above-mentioned solid composition will be described.

The solid composition according to the present disclosure can be produced, for example, as follows.

[2-1] Preparation of Mixed Liquid

First, a mixed liquid containing multiple types of metal compounds containing a metal element constituting the precursor oxide in a molecule and a solvent are prepared.

This mixed liquid can be obtained by, for example, stoichiometrically mixing the multiple types of metal compounds containing a metal element constituting the precursor oxide in a molecule at a ratio corresponding to the composition of the functional ceramic to be finally formed. Note that in place of a solution containing a solvent, a dispersion liquid containing a dispersion medium may be used.

In the preparation of the mixed liquid, for example, an oxoacid compound may be used as a compound different from a metal compound. Further, by using a compound containing an oxoanion corresponding to the oxoacid compound as a metal compound, it is not necessary to additionally use the oxoacid compound different from the above-mentioned metal compound in addition to the metal compound.

Further, the oxoacid compound may be added during or after the below-mentioned first heat treatment or may be added during or after the below-mentioned second heat treatment, however, hereinafter, a case where at least one type of the metal compounds to be used in the preparation of the mixed liquid is a metal compound containing an oxoanion corresponding to the oxoacid compound will be mainly described.

As the metal compounds containing a metal element constituting the precursor oxide in a molecule, for example, the following compounds can be used.

Examples of an yttrium compound as an yttrium source include yttrium metal salts and yttrium alkoxides, and among these, one type or a combination of two or more types can be used. Examples of the yttrium metal salts include yttrium chloride, yttrium nitrate, yttrium sulfate, yttrium acetate, yttrium hydroxide, and yttrium carbonate. Further, examples of the yttrium alkoxides include yttrium methoxide, yttrium ethoxide, yttrium propoxide, yttrium isopropoxide, yttrium butoxide, yttrium isobutoxide, yttrium sec-butoxide, yttrium tert-butoxide, and yttrium dipivaloylmethanate. By using the yttrium compound as described above, as the functional ceramic, for example, YAG:$Ce^{3+}$ to be used as a phosphor ceramic or the like, that is, cerium-doped yttrium aluminum garnet or YBCO to be used as a superconductor ceramic or the like, that is, yttrium barium copper perovskite can be favorably produced using the solid composition according to the present disclosure. Among these, as the yttrium compound, at least one of yttrium ethoxide and yttrium nitrate is preferred. As the yttrium source, a hydrate may be used.

Further, examples of an aluminum compound as an aluminum source include aluminum metal salts and aluminum alkoxides, and among these, one type or a combination of two or more types can be used. Examples of the aluminum metal salts include aluminum chloride, aluminum nitrate, aluminum sulfate, and aluminum acetate. Further, examples of the aluminum alkoxides include aluminum trimethoxide, aluminum triethoxide, aluminum tripropoxide, aluminum triisopropoxide, aluminum tributoxide, aluminum triisobutoxide, aluminum tri-sec-butoxide, aluminum tri-tert-butoxide, and aluminum dipivaloylmethanate. By using the aluminum compound as described above, as the functional ceramic, for example, YAG:$Ce^{3+}$ to be used as a phosphor ceramic or the like, that is, cerium-doped yttrium aluminum garnet can be favorably produced using the solid composition according to the present disclosure. Among these, as the aluminum compound, at least one of aluminum nitrate and aluminum triisopropoxide is preferred. As the aluminum source, a hydrate may be used.

Further, examples of a cerium compound as a cerium source include cerium metal salts and cerium alkoxides, and among these, one type or a combination of two or more types can be used. Examples of the cerium metal salts include cerium chloride, cerium bromide, cerium nitrate, and cerium sulfate. Further, examples of the cerium alkoxides include cerium trimethoxide, cerium triethoxide, cerium triisopropoxide, cerium tri-n-propoxide, cerium triisobutoxide, cerium tri-n-butoxide, cerium tri-sec-butoxide, and cerium tri-tert-butoxide. By using the cerium compound as described above, as the functional ceramic, for example, YAG:$Ce^{3+}$ to be used as a phosphor ceramic or the like, that is, cerium-doped yttrium aluminum garnet can be favorably produced using the solid composition according to the present disclosure. Among these, as the cerium compound, at least one of cerium nitrate and cerium triisopropoxide is preferred. As the cerium source, a hydrate may be used.

Further, examples of a barium compound as a barium source include barium metal salts and organic barium compounds, and among these, one type or a combination of two or more types can be used. Examples of the barium metal salts include barium chloride, barium nitrate, barium sulfate, and barium acetate. Further, examples of the organic barium compounds include barium dimethoxide, barium diethoxide, barium diipropoxide, barium diisopropoxide, barium dibutoxide, barium diisobutoxide, barium di-sec-butoxide, barium di-tert-butoxide, and barium dipivaloylmethanate. By using the barium compound as described above, as the functional ceramic, for example, YBCO to be used as a superconductor ceramic or the like, that is, yttrium barium copper perovskite can be favorably produced using the solid composition according to the present disclosure. Among these, as the barium compound, at least one of barium nitrate and barium diethoxide is preferred. As the barium source, a hydrate may be used.

Further, examples of a copper compound as a copper source include copper metal salts and organic copper compounds, and among these, one type or a combination of two or more types can be used. Examples of the copper metal salts include copper chloride, copper bromide, copper nitrate, and copper sulfate. Further, examples of the organic copper compounds include copper dimethoxide, copper diethoxide, copper diisopropoxide, copper di-n-propoxide, copper diisobutoxide, copper di-n-butoxide, copper di-sec-butoxide, copper di-tert-butoxide, and copper bis(dipivaloylmethanate). By using the copper compound as described above, as the functional ceramic, for example, YBCO to be used as a superconductor ceramic or the like, that is, yttrium barium copper perovskite can be favorably produced using the solid composition according to the present disclosure. Among these, as the copper compound, at least one of copper nitrate and copper bis(dipivaloylmethanate) is preferred. As the copper source, a hydrate may be used.

The solvent is not particularly limited, and for example, various types of organic solvents can be used, however, more specifically, for example, alcohols, glycols, esters, ethers, organic acids, aromatics, and amides are exemplified, and one type or a mixed solvent that is a combination of two or more types selected from these can be used. Examples of the alcohols include methyl alcohol, ethyl alcohol, n-propyl alcohol, isopropyl alcohol, n-butyl alcohol, allyl alcohol, and 2-n-butoxyethanol. Examples of the glycols include ethylene glycol, propylene glycol, butylene glycol, hexylene glycol, pentanediol, hexanediol, heptanediol, and dipropylene glycol. Examples of the esters include ketones such as dimethyl ketone, methyl ethyl ketone, methyl propyl ketone, and methyl isobutyl ketone, methyl formate, ethyl formate, methyl acetate, and methyl acetoacetate. Examples of the ethers include diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. Examples of the organic acids include formic acid, acetic acid, 2-ethylbutyric acid, and propionic acid. Examples of the aromatics include toluene, o-xylene, and p-xylene. Examples of the amides include formamide, N,N-dimethylformamide, N,N-diethylformamide, dimethylacetamide, and N-methylpyrrolidone. Among these, as the solvent, at least one of 2-n-butoxyethanol and propionic acid is preferred.

[2-2] First Heat Treatment

The mixed liquid prepared as described above is subjected to a first heat treatment. By doing this, the mixed liquid is generally gelled.

Although the conditions for the first heat treatment depend on the boiling point or vapor pressure of the solvent, or the like, the heating temperature in the first heat treatment is preferably 50° C. or higher and 250° C. or lower, more preferably 60° C. or higher and 230° C. or lower, further more preferably 80° C. or higher and 200° C. or lower. In the first heat treatment, the heating temperature may be changed. For example, the first heat treatment may include a first stage in which the heat treatment is performed while maintaining a relatively low temperature, and a second stage in which the temperature is raised after the first stage, and the heat treatment is performed at a relatively high temperature. In such a case, it is preferred that the highest temperature in the first heat treatment falls within the above-mentioned range.

Further, the heating time in the first heat treatment is preferably 10 minutes or more and 180 minutes or less, more preferably 20 minutes or more and 120 minutes or less, further more preferably 30 minutes or more and 60 minutes or less.

The first heat treatment may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the first heat treatment may be performed under reduced pressure or vacuum, or under pressure.

Further, in the first heat treatment, the atmosphere may be maintained under substantially the same conditions, or may be changed to different conditions. For example, the first heat treatment may include a first stage in which the heat treatment is performed in a normal pressure environment and a second stage in which the heat treatment is performed in a reduced pressure environment after the first stage.

[2-3] Second Heat Treatment

Subsequently, the mixture obtained by the first heat treatment, that is, the mixture in a gel form is subjected to a second heat treatment.

By doing this, the solid composition containing the precursor oxide and the oxoacid compound is obtained.

Although the conditions for the second heat treatment depend on the composition of the oxide to be formed or the like, the heating temperature in the second heat treatment is preferably 400° C. or higher and 600° C. or lower, more preferably 430° C. or higher and 570° C. or lower, further more preferably 450° C. or higher and 550° C. or lower. In the second heat treatment, the heating temperature may be changed. For example, the second heat treatment may include a first stage in which the heat treatment is performed while maintaining a relatively low temperature, and a second stage in which the temperature is raised after the first stage, and the heat treatment is performed at a relatively high temperature. In such a case, it is preferred that the highest temperature in the second heat treatment falls within the above-mentioned range.

Further, the heating time in the second heat treatment is preferably 5 minutes or more and 180 minutes or less, more preferably 10 minutes or more and 120 minutes or less, further more preferably 15 minutes or more and 60 minutes or less.

The second heat treatment may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the second heat treatment may be performed under reduced pressure or vacuum, or under pressure. In particular, the second heat treatment is preferably performed in an oxidizing atmosphere.

Further, in the second heat treatment, the atmosphere may be maintained under substantially the same conditions, or may be changed to different conditions. For example, the second heat treatment may include a first stage in which the heat treatment is performed in an inert gas atmosphere and a second stage in which the heat treatment is performed in an oxidizing atmosphere after the first stage.

In the solid composition obtained in this manner, generally the solvent used in the production process therefor is mostly removed, but the solvent may partially remain. However, the content ratio of the solvent in the solid composition is preferably 1.0 mass % or less, more preferably 0.1 mass % or less.

The solid composition according to the present disclosure obtained as described above is converted into the functional ceramic by heating as described in detail later, particularly by heating to a temperature higher than in the above-mentioned second heat treatment.

Therefore, when the heat treatment for obtaining the functional ceramic from the solid composition according to the present disclosure is regarded as main firing, the above-mentioned second heat treatment can be said to be calcination. Further, when the functional ceramic obtained by the heat treatment to be described in detail later is regarded as a main fired body, the solid composition according to the present disclosure obtained through the above-mentioned second heat treatment can be said to be a calcined body.

[3] Production Method for Functional Ceramic

Next, a production method for a functional ceramic according to the present disclosure will be described.

The production method for a functional ceramic according to the present disclosure includes a heating step of heating the solid composition according to the present disclosure to a temperature of 700° C. or higher and 1000° C. or lower.

According to this, by the heat treatment at a relatively low temperature for a relatively short time, the functional ceramic having a desired property can be stably formed. More specifically, by incorporating an oxoacid compound in the solid composition, the melting point of the oxide is lowered, and growth of a high-temperature phase crystal can be promoted by a firing treatment that is a heat treatment at a relatively low temperature for a relatively short time. Further, while suppressing etching at an interface or generation of a byproduct, the melting point of the oxide is lowered, and the firing temperature or the joining temperature to a heterogeneous material can be lowered, and for example, the adhesion to an adherend can be made excellent even by a heat treatment at a relatively low temperature. In addition, the functional ceramic can be produced by the heat treatment at a relatively low temperature for a relatively short time, and therefore, for example, the productivity of the functional ceramic can be made more excellent, and also it is preferred from the viewpoint of saving energy. Further, according to the production method for a functional ceramic according to the present disclosure, there is an advantage that the above-mentioned effect can be obtained regardless of the conditions such as the composition of the solid composition, particularly the composition or the crystal type of the precursor oxide, or the like.

The heating temperature in the heating step in the production method for a functional ceramic according to the present disclosure need only be 700° C. or higher and 1000° C. or lower as described above, but is preferably 730° C. or higher and 980° C. or lower, more preferably 750° C. or higher and 950° C. or lower, further more preferably 780° C. or higher and 930° C. or lower.

According to this, the above-mentioned effect is more remarkably exhibited.

In the heating step in the production method for a functional ceramic according to the present disclosure, the heating temperature may be changed. For example, the heating step in the production method for a functional ceramic according to the present disclosure may include a first stage in which the heat treatment is performed while maintaining a relatively low temperature, and a second stage in which the temperature is raised after the first stage, and the heat treatment is performed at a relatively high temperature. In such a case, it is preferred that the highest temperature in the heating step falls within the above-mentioned range.

The heating time in the heating step in the production method for a functional ceramic according to the present disclosure is not particularly limited, but is preferably 5 minutes or more and 300 minutes or less, more preferably 10 minutes or more and 120 minutes or less, further more preferably 15 minutes or more and 60 minutes or less.

According to this, the above-mentioned effect is more remarkably exhibited.

The heating step may be performed in any atmosphere, and may be performed in an oxidizing atmosphere such as in the air or in an oxygen gas atmosphere, or may be performed in a non-oxidizing atmosphere of an inert gas such as nitrogen gas, helium gas, or argon gas, or the like. Further, the heating step may be performed under reduced pressure or vacuum, or under pressure. In particular, the heating step is preferably performed in an oxidizing atmosphere.

Further, in the heating step, the atmosphere may be maintained under substantially the same conditions, or may be changed to different conditions.

According to the production method for a functional ceramic according to the present disclosure, a target functional ceramic, in particular, a high quality functional ceramic can be obtained by the heat treatment at a relatively low temperature as described above, however, the present disclosure does not exclude also performing a heat treatment at a higher temperature, in particular, a heat treatment at a higher temperature for a relatively short time in addition to the heat treatment in the temperature range as described above.

Further, in the production method for a functional ceramic according to the present disclosure, the solid composition according to the present disclosure may be subjected to the heating step as described above in a state where the solid composition according to the present disclosure is mixed with another component.

The production method for a functional ceramic according to the present disclosure may include a step other than the above-mentioned heating step.

The functional ceramic obtained using the production method for a functional ceramic according to the present disclosure generally does not substantially contain the oxoacid compound contained in the solid composition according to the present disclosure used as the raw material. More specifically, the content ratio of the oxoacid compound in the functional ceramic obtained using the production method for a functional ceramic according to the present disclosure is generally 100 ppm or less, and particularly, it is preferably 50 ppm or less, more preferably 10 ppm or less.

According to this, the content ratio of an undesirable impurity in the functional ceramic can be suppressed, and the properties and reliability of the functional ceramic can be made more excellent.

[4] Functional Ceramic

The functional ceramic according to the present disclosure can be obtained by the production method as described above. Here, the functional ceramic refers to a ceramic having some sort of function such as an optical function, a magnetic function, an electrical function, a chemical function, or a thermodynamic function.

The function, type, intended use, or the like of the functional ceramic is not particularly limited, however, for example, a phosphor ceramic, a wavelength conversion ceramic, a magnetic ceramic, a superconductor ceramic, a dielectric ceramic, a catalytic ceramic, a thermoelectric ceramic, and the like are exemplified.

The functional ceramic obtained as described above is preferably, for example, a ceramic that satisfies the following conditions.

When the functional ceramic is a phosphor ceramic, it is preferably a ceramic having a high crystalline property and high sinterability so that an exciton generated by excitation light emits fluorescence without being trapped in a band that does not contribute to light emission derived from a crystal defect, and also the excitation light excites an activator without causing significant internal scattering.

According to this, a fluorescence source having high internal quantum efficiency and external extraction efficiency, and high fluorescence emission efficiency with respect to the excitation light is obtained.

Further, when the functional ceramic is an oxide-based superconductor ceramic, it is preferably a ceramic having a few crystal defects, particularly, a few oxygen defects, and also having a low crystal grain boundary density, and further having a high crystal grain orientation.

According to this, a superconducting transition temperature Tc is increased, and also a critical current density Jc is improved, and therefore, a superconductive wire that allows a large current to flow at a relatively high temperature, or the like can be formed.

Further, when the functional ceramic is a magnetic ceramic, a magnetic body having a higher saturation magnetization in a magnetic field bias is obtained as the oxygen deficiency in a crystal is less and the crystalline property is higher, and for example, a resonator having a higher Q value can be produced.

Further, when the functional ceramic is used in an element designed so that a strong magnetic field can be applied by an appropriate electromagnet, a filter or a tuning circuit to which the property of a resonator having a high Q value is applied can be produced.

Hereinabove, preferred embodiments of the present disclosure have been described, however, the present disclosure is not limited thereto.

For example, the production method for a functional ceramic may be applied to a method further including another step in addition to the step as described above.

EXAMPLES

Next, specific Examples of the present disclosure will be described.

[5] Production of Solid Composition

Example 1

First, yttrium triethoxide as an yttrium source, aluminum nitrate nonahydrate as an aluminum source, cerium(III) nitrate hexahydrate as a cerium source, and 2-n-butoxyethanol as a solvent were mixed at a predetermined ratio, whereby a mixed liquid having a composition shown in Table 1 was obtained.

Subsequently, the thus obtained mixed liquid was subjected to a first heat treatment in the air at 140° C. for 20 minutes in a state of being placed in a beaker made of titanium, whereby a mixture in a gel form was obtained.

Subsequently, the thus obtained mixture in a gel form was subjected to a second heat treatment in the air at 540° C. for 20 minutes, whereby a solid composition that is a thermally decomposed product in an ash form was obtained.

The thus obtained solid composition was a composition containing a precursor oxide constituted by a perovskite-type crystal phase and aluminum nitrate as an oxoacid compound. Further, the ratio of the content ratio of the oxoacid compound to the content ratio of the precursor oxide in the obtained solid composition, that is, the value of XO/XP when the content ratio of the precursor oxide in the solid composition was represented by XP [mass %] and the content ratio of the oxoacid compound in the solid composition was represented by XO [mass %] was 0.0270.

Examples 2 to 12

Solid compositions were produced in the same manner as in the above-mentioned Example 1 except that a mixed liquid was prepared in the same manner as in the above-mentioned Example 1 except that the composition of the mixed liquid is as shown in Table 1 or 2 by changing the types and the used amounts of raw materials to be used for preparing the mixed liquid, and the mixed liquid was used.

Comparative Examples 1 to 3

Solid compositions were produced in the same manner as in the above-mentioned Example 1 except that a mixed liquid was prepared in the same manner as in the above-mentioned Example 1 except that the composition of the mixed liquid is as shown in Table 2 by changing the types and the used amounts of raw materials to be used for preparing the mixed liquid without using an oxoacid compound containing an oxoanion, and the mixed liquid was used.

Comparative Example 4

A mixed powder was obtained by weighing 4.57 parts by mass of a $Y_2O_3$ powder, 0.216 parts by mass of a $CeO_2$ powder, and 3.55 parts by mass of an $Al_2O_3$ powder, and sufficiently mixing these powders using an agate mortar.

Subsequently, the thus obtained mixed powder was subjected to a heat treatment in the air at 540° C. for 20 minutes, whereby a solid composition was obtained.

Comparative Examples 5 and 6

Solid compositions were produced in the same manner as in the above-mentioned Comparative Example 4 except that the composition of the raw material powders and the mixing ratios thereof were changed.

The compositions and ratios of the raw materials used for preparing the solid compositions of the respective Examples and the respective Comparative Examples, and the production conditions for the solid compositions are collectively shown in Tables 1 and 2, and the conditions for the solid compositions of the respective Examples and the respective Comparative Examples are collectively shown in Table 3. Further, in Table 3, the value of XO/XP when the content ratio of the oxoacid compound in the solid composition is represented by XO [mass %] and the content ratio of the precursor oxide in the solid composition is represented by XP [mass %] is also shown. Further, in all the solid compositions obtained in the respective Examples and the respective Comparative Examples, the content ratio of the solvent was 0.1 mass % or less. Further, when measurement was performed by TG-DTA at a temperature raising rate of 10° C./min for some of the solid compositions of the respective Examples, only one exothermic peak was observed in a range of 300° C. or higher and 1,000° C. or lower in all cases. From the results, it can be said that the solid compositions of Examples 1, 3, 4, and 9 to 12 are constituted by a substantially single crystal phase.

TABLE 1

| | | Composition of mixed liquid | | | First heat treatment | Second heat treatment | | |
|---|---|---|---|---|---|---|---|---|
| | Raw material compound | | Solvent | | | | | |
| | type | Content [parts by mass] | type | Content [parts by mass] | Heating temperature [° C.] | Heating temperature [° C.] | Heating time [min] | Atmosphere |
| Example 1 | yttrium triethoxide | 6.52 | 2-n-butoxyethanol | 171 | 140 | 540 | 20 | air |
| | aluminum nitrate nonahydrate | 18.75 | | | | | | |
| | cerium nitrate hexahydrate | 0.39 | | | | | | |
| Example 2 | yttrium triethoxide | 6.52 | 2-n-butoxyethanol | 197 | 140 | 540 | 20 | air |
| | aluminum triisopropoxide | 10.20 | | | | | | |
| | cerium nitrate hexahydrate | 0.39 | | | | | | |
| Example 3 | yttrium nitrate hexahydrate | 11.15 | 2-n-butoxyethanol | 151 | 140 | 540 | 20 | air |
| | aluminum nitrate nonahydrate | 18.75 | | | | | | |
| | cerium nitrate hexahydrate | 0.39 | | | | | | |
| Example 4 | yttrium nitrate hexahydrate | 11.15 | 2-n-butoxyethanol | 153 | 140 | 540 | 20 | air |
| | aluminum nitrate nonahydrate | 9.375 | | | | | | |
| | cerium nitrate hexahydrate | 0.39 | | | | | | |
| | aluminum sulfate 16-hydrate | 7.875 | methanol | | | | | |
| Example 5 | yttrium triethoxide | 2.24 | 2-n-butoxyethanol | 213 | 140 | 540 | 20 | air |
| | barium nitrate | 5.22 | | | | | | |
| | copper nitrate trihydrate | 7.26 | | | | | | |
| Example 6 | yttrium triethoxide | 2.24 | 2-n-butoxyethanol | 217 | 140 | 540 | 20 | air |
| | barium diethoxide | 4.54 | | | | | | |
| | copper nitrate trihydrate | 7.26 | | | | | | |
| Example 7 | yttrium nitrate hexahydrate | 3.83 | 2-n-butoxyethanol | 181 | 140 | 540 | 20 | air |
| | barium nitrate | 7.50 | | | | | | |
| | copper nitrate trihydrate | 7.26 | | | | | | |
| Example 8 | yttrium nitrate hexahydrate | 3.83 | 2-n-butoxyethanol | 180 | 140 | 540 | 20 | air |
| | barium nitrate | 7.50 | | | | | | |
| | copper nitrate trihydrate | 3.63 | | | | | | |
| | copper sulfate pentahydrate | 3.75 | methanol | | | | | |

TABLE 2

| | | Composition of mixed liquid | | | First heat treatment | Second heat treatment | | |
|---|---|---|---|---|---|---|---|---|
| | Raw material compound | | Solvent | | | | | |
| | type | Content [parts by mass] | type | Content [parts by mass] | Heating temperature [° C.] | Heating temperature [° C.] | Heating time [min] | Atmosphere |
| Example 9 | yttrium triethoxide | 6.72 | 2-n-butoxyethanol | 173 | 140 | 540 | 20 | air |
| | aluminum nitrate nonahydrate | 2.25 | | | | | | |
| | iron nitrate nonahydrate | 17.78 | | | | | | |
| Example 10 | yttrium triethoxide | 6.72 | 2-n-butoxyethanol | 191 | 140 | 540 | 20 | air |
| | aluminum triisopropoxide | 1.22 | | | | | | |
| | iron nitrate nonahydrate | 17.78 | | | | | | |
| Example 11 | yttrium nitrate hexahydrate | 11.49 | 2-n-butoxyethanol | 152 | 140 | 540 | 20 | air |
| | aluminum nitrate nonahydrate | 2.25 | | | | | | |
| | iron nitrate nonahydrate | 17.78 | | | | | | |
| Example 12 | yttrium nitrate hexahydrate | 11.49 | 2-n-butoxyethanol | 153 | 140 | 540 | 20 | air |
| | aluminum nitrate nonahydrate | 1.125 | | | | | | |
| | iron nitrate nonahydrate | 17.78 | | | | | | |
| | aluminum sulfate 16-hydrate | 0.944 | methanol | | | | | |
| Comparative Example 1 | yttrium triethoxide | 6.52 | 2-n-butoxyethanol | 208 | 140 | 540 | 20 | air |
| | aluminum triisopropoxide | 10.20 | | | | | | |
| | cerium triisopropoxide | 0.29 | | | | | | |
| Comparative Example 2 | yttrium triethoxide | 2.24 | 2-n-butoxyethanol | 192 | 140 | 540 | 20 | air |
| | barium diethoxide | 4.54 | | | | | | |
| | copper bis(dipivaloylmethanate) | 12.90 | | | | | | |
| Comparative Example 3 | yttrium triethoxide | 6.72 | 2-n-butoxyethanol | 198 | 140 | 540 | 20 | air |
| | aluminum triisopropoxide | 1.22 | | | | | | |
| | iron tris(2,4-pentanedionate) | 15.53 | | | | | | |
| Comparative Example 4 | $Y_2O_3$, $Al_2O_3$, $CeO_2$ | 4.57, 3.55, 0.216 | — | — | — | 540 | 20 | air |

TABLE 2-continued

| | Composition of mixed liquid | | | | First heat treatment | Second heat treatment | | |
| | Raw material compound | | Solvent | | | | | |
| | type | Content [parts by mass] | type | Content [parts by mass] | Heating temperature [° C.] | Heating temperature [° C.] | Heating time [min] | Atmosphere |
|---|---|---|---|---|---|---|---|---|
| Comparative Example 5 | $Y_2O_3$, BaO, CuO | 3.15, 4.27, 3.32 | — | — | — | 540 | 20 | air |
| Comparative Example 6 | $Y_2O_3$, $Al_2O_3$, $FeO_3$ | 4.72, 0.43, 4.89 | — | — | — | 540 | 20 | air |

TABLE 3

| | Precursor oxide | | | Oxoacid compound | | |
| | Crystal phase | Crystal grain size [nm] | Content ratio XP [mass %] | Composition | Content ratio XO [mass %] | XO/XP |
|---|---|---|---|---|---|---|
| Example 1 | perovskite | 40 | 68 | $Al(NO_3)_3$ | 12 | 0.0270 |
| Example 2 | cerium carbonate, aluminum oxide, perovskite | 40 | 72 | $Ce(NO_3)_3$ | 8 | 0.0140 |
| Example 3 | perovskite | 40 | 66 | $Al(NO_3)_3$ | 13 | 0.0480 |
| Example 4 | perovskite | 40 | 66 | $Al(NO_3)_3$ | 13 | 0.0470 |
| Example 5 | copper oxide, $BaCO_3$, yttrium carbonate | 40 | 68 | $Cu(NO_3)_2$ | 19 | 0.0330 |
| Example 6 | copper oxide, $BaCo_3$, yttrium carbonate | 40 | 69 | $Cu(NO_3)_2$ | 14 | 0.0060 |
| Example 7 | cubic crystal ($BaCuO_2$-like crystal) | 40 | 64 | $Cu(NO_3)_2$ | 21 | 0.0450 |
| Example 8 | cubic crystal ($BaCuO_2$-like crystal) | 40 | 65 | $Cu(NO_3)_2$ | 20 | 0.0450 |
| Example 9 | $YFeO_3$ | 40 | 63 | $Al(NO_3)_3$ | 23 | 0.0260 |
| Example 10 | $YFeO_3$ | 40 | 66 | $Al(NO_3)_3$ | 19 | 0.0060 |
| Example 11 | $YFeO_3$ | 40 | 62 | $Al(NO_3)_3$ | 25 | 0.0510 |
| Example 12 | $YFeO_3$ | 40 | 62 | $Al(NO_3)_3$ | 25 | 0.0490 |
| Comparative Example 1 | cerium carbonate, yttrium oxide, aluminum oxide | 200 | 89 | — | — | — |
| Comparative Example 2 | $BaCO_3$, copper oxide, yttrium oxide | 600 | 100 | — | — | — |
| Comparative Example 3 | $YFeO_3$, $Fe_2O_3$ | 600 | 100 | — | — | — |
| Comparative Example 4 | $Y_2O_3$, $Al_2O_3$, $CeO_2$ | 600 | 100 | — | — | — |
| Comparative Example 5 | $Y_2O_3$, BaO, CuO | 600 | 100 | — | — | — |
| Comparative Example 6 | $Y_2O_3$, $Al_2O_3$, $FeO_3$ | 600 | 100 | — | — | — |

[6] Production of Functional Ceramic

By using the solid compositions of the respective Examples and the respective Comparative Examples, functional ceramics were produced as follows.

First, 1 g of a sample was taken out from each of the solid compositions.

Subsequently, each sample thereof was filled in a pellet die with an exhaust port having an inner diameter of 13 mm manufactured by Specac, Inc., followed by press molding under a load of 6 kN, whereby a pellet as a molded material was obtained. The obtained pellet was placed in a crucible made of alumina, and fired in an air atmosphere at 900° C. for 8 hours, whereby a functional ceramic in a pellet form was obtained.

With respect to the solid compositions of the respective Examples and the respective Comparative Examples and the functional ceramics obtained as described above using the solid compositions, an analysis was performed using an X-ray diffractometer X' Pert PRO manufactured by Philips Electron Optics, Inc., whereby X-ray diffraction patterns were obtained.

As a result, it was confirmed that in the respective Examples, the precursor oxide contained in the solid composition and the functional ceramic are constituted by mutually different crystal phases.

Figure 2:
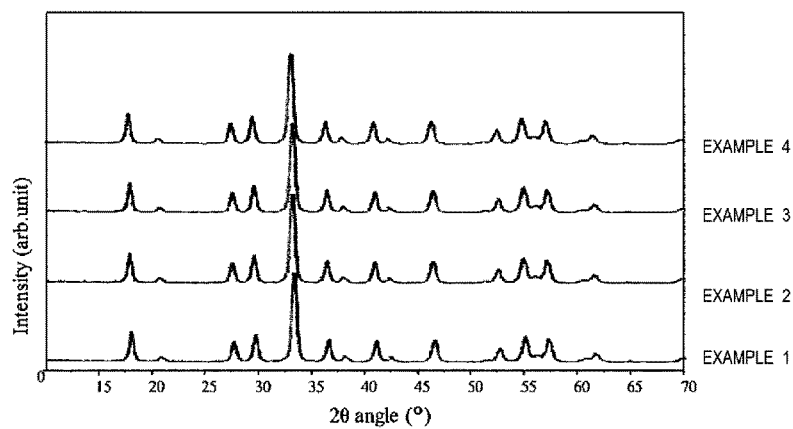
FIG. 2 is a graph showing X-ray diffraction patterns for functional ceramics according to Examples 1 to 4.

The X-ray diffraction patterns obtained when using the solid compositions of the above-mentioned Examples 1 to 4 as the sample are shown in FIG. 1, and the X-ray diffraction patterns obtained when using the functional ceramics according to the above-mentioned Examples 1 to 4 as the sample are shown in FIG. 2.

From these results, it was confirmed that in the respective Examples, the precursor oxide contained in the solid composition is constituted by a crystal phase different from that of the functional ceramic formed using the solid composition.

In Table 4, the compositions and the crystal phases of the functional ceramics according to the respective Examples and the respective Comparative Examples are collectively shown. The content ratio of the oxoacid compound in each of the functional ceramics according to the respective Examples and the respective Comparative Examples was 10 ppm or less.

TABLE 4

| | Composition | Crystal phase |
|---|---|---|
| Example 1 | $Y_{2.91}Ce_{0.09}Al_5O_{12}$ | cubic garnet-type |
| Example 2 | $Y_{2.91}Ce_{0.09}Al_5O_{12}$ | cubic garnet-type |

TABLE 4-continued

| | Composition | Crystal phase |
|---|---|---|
| Example 3 | $Y_{2.91}Ce_{0.09}Al_5O_{12}$ | cubic garnet-type |
| Example 4 | $Y_{2.91}Ce_{0.09}Al_5O_{12}$ | cubic garnet-type |
| Example 5 | $YBa_2Cu_3O_{7-\delta}$ | perovskite-type |
| Example 6 | $YBa_2Cu_3O_{7-\delta}$ | perovskite-type |
| Example 7 | $YBa_2Cu_3O_{7-\delta}$ | perovskite-type |
| Example 8 | $YBa_2Cu_3O_{7-\delta}$ | perovskite-type |
| Example 9 | $Y_3Al_{0.6}Fe_{4.4}O_{12}$ | garnet-type |
| Example 10 | $Y_3Al_{0.6}Fe_{4.4}O_{12}$ | garnet-type |
| Example 11 | $Y_3Al_{0.6}Fe_{4.4}O_{12}$ | garnet-type |
| Example 12 | $Y_3Al_{0.6}Fe_{4.4}O_{12}$ | garnet-type |
| Comparative Example 1 | $Y_{2.91}Ce_{0.09}Al_5O_{12}$ | cubic garnet-type |
| Comparative Example 2 | $YBa_2Cu_3O_{7-\delta}$ | perovskite-type |
| Comparative Example 3 | $Y_3A_{10.6}Fe_{4.4}O_{12}$ | $YFeO_3$-type |
| Comparative Example 4 | $Y_2O_3$, $Al_2O_3$, $CeO_2$ | $Y_2O_3$, $Al_2O_3$, $CeO_2$ |
| Comparative Example 5 | $Y_2O_3$, BaO, CuO | $Y_2O_3$, BaO, CuO |
| Comparative Example 6 | $Y_2O_3$, $Al_2O_3$, $Fe_2O_3$ | $Y_2O_3$, $Al_2O_3$, $Fe_2O_3$ |

[7] Evaluation

[7-1] Evaluation of Internal Quantum Yield

The following evaluation was performed for the functional ceramics according to Examples 1 to 4 and Comparative Examples 1 and 4 among the functional ceramics produced in the above [6].

That is, with respect to the functional ceramics according to Examples 1 to 4 and Comparative Examples 1 and 4 that are phosphor ceramics, an internal quantum yield as a fluorescence property was determined by measurement using an absolute PL quantum yield measurement device (Quantaurus-QYC 11347-01, manufactured by Hamamatsu Photonics K.K.).

The results are collectively shown in Table 5.

TABLE 5

| | Internal quantum yield [%] |
|---|---|
| Example 1 | 38.3 |
| Example 2 | 22.4 |
| Example 3 | 36.4 |
| Example 4 | 36.1 |
| Comparative Example 1 | below measurement limit |
| Comparative Example 4 | below measurement limit |

Figure 3:
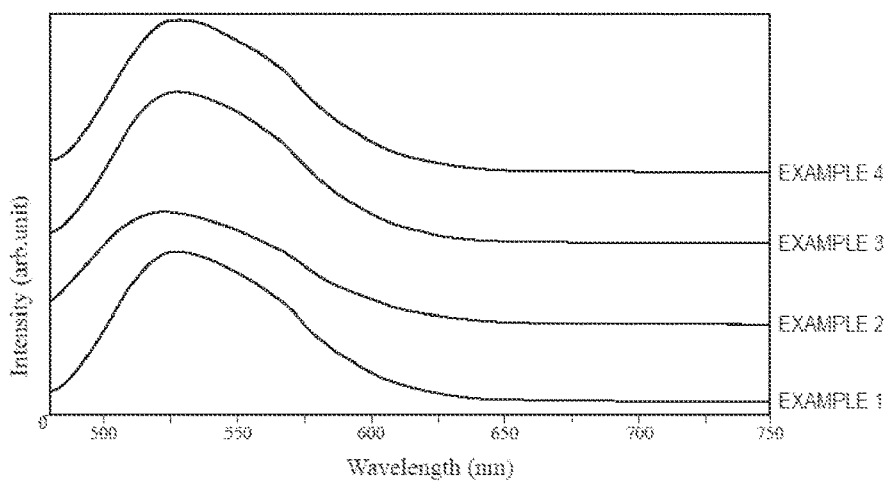
FIG. 3 is a graph showing emission spectra obtained by measurement using a fluorescence spectrophotometer for the functional ceramics according to Examples 1 to 4.

As apparent from Table 5, excellent results were obtained according to the present disclosure. On the other hand, satisfactory results could not be obtained in Comparative Examples. Further, with respect to the functional ceramics according to Examples 1 to 4 that are phosphor ceramics, emission spectra obtained by measurement using a fluorescence spectrophotometer (F-7000, manufactured by Hitachi High-Tech Science Corporation) are shown in FIG. 3.

[7-2] Evaluation of Critical Current in Magnetic Field

With respect to the functional ceramics according to Examples 5 to 8 and Comparative Examples 2 and 5 among the functional ceramics produced in the above [6], the following evaluation was performed.

That is, to both main faces of the functional ceramics according to Examples 5 to 8 and Comparative Examples 2 and 5 that are superconductor ceramics, an indium electrode was bonded, and measurement of a critical current in a magnetic field of a 3T magnet at 77.3 K that is the liquid nitrogen temperature was performed by a four-terminal method.

The results are collectively shown in Table 6.

TABLE 6

| | Critical current in magnetic field [A/cm-w] |
|---|---|
| Example 5 | 220 |
| Example 6 | 34 |
| Example 7 | 189 |
| Example 8 | 189 |
| Comparative Example 2 | below detection limit |
| Comparative Example 5 | below detection limit |

As apparent from Table 6, excellent results were obtained according to the present disclosure. On the other hand, satisfactory results could not be obtained in Comparative Examples.

[7-3] Measurement and Evaluation of Magnetic Susceptibility

With respect to the functional ceramics according to Examples 9 to 12 and Comparative Examples 3 and 6 among the functional ceramics produced in the above [6], the following evaluation was performed.

That is, with respect to the functional ceramics according to Examples 9 to 12 and Comparative Examples 3 and 6 that are magnetic ceramics, a saturation magnetization and a ferromagnetic resonance half width ΔH were determined using a vibrating sample magnetometer (VSM-C7, manufactured by Toei Industry Co., Ltd.).

The results are collectively shown in Table 7.

TABLE 7

| | Saturation magnetization ($4\pi Js$) | Ferromagnetic resonance half width ΔH (Oe) |
|---|---|---|
| Example 9 | 1720 | 50 |
| Example 10 | 1640 | 45 |
| Example 11 | 1720 | 50 |
| Example 12 | 1710 | 50 |
| Comparative Example 3 | 570 | 600 |
| Comparative Example 6 | below measurement limit | below measurement limit |

As apparent from Table 7, excellent results were obtained according to the present disclosure. On the other hand, satisfactory results could not be obtained in Comparative Examples.

As described above, according to the present disclosure, excellent results were obtained in all cases regardless of the types of the functional ceramics.

What is claimed is:

1. A solid composition, which is to be used for forming a functional ceramic having a crystal phase, the solid composition comprising:
    an oxide constituted by a crystal phase different from the crystal phase of the functional ceramic at normal temperature and normal pressure; and
    an oxoacid compound,
    wherein the crystal phase of the oxide is a perovskite-type crystal, and the crystal phase of the functional ceramic is a cubic garnet-type crystal.

2. The solid composition according to claim 1, wherein the oxoacid compound contains at least one of a nitrate ion and a sulfate ion as an oxoanion.

3. A solid composition, which is to be used for forming a functional ceramic having a crystal phase, the solid composition comprising:

an oxide constituted by a crystal phase different from the crystal phase of the functional ceramic at normal temperature and normal pressure; and an oxoacid compound, wherein the crystal phase of the oxide is a $YFeO_3$-type crystal, and the crystal phase of the functional ceramic is a garnet-type crystal.

4. The solid composition according to claim 1, wherein the oxide has a crystal grain size of 10 nm or more and 200 nm or less.

5. A production method for a functional ceramic, comprising heating the solid composition according to claim 1 to a temperature of 700° C. or higher and 1000° C. or lower.

* * * * *